ured Apr. 7, 1970

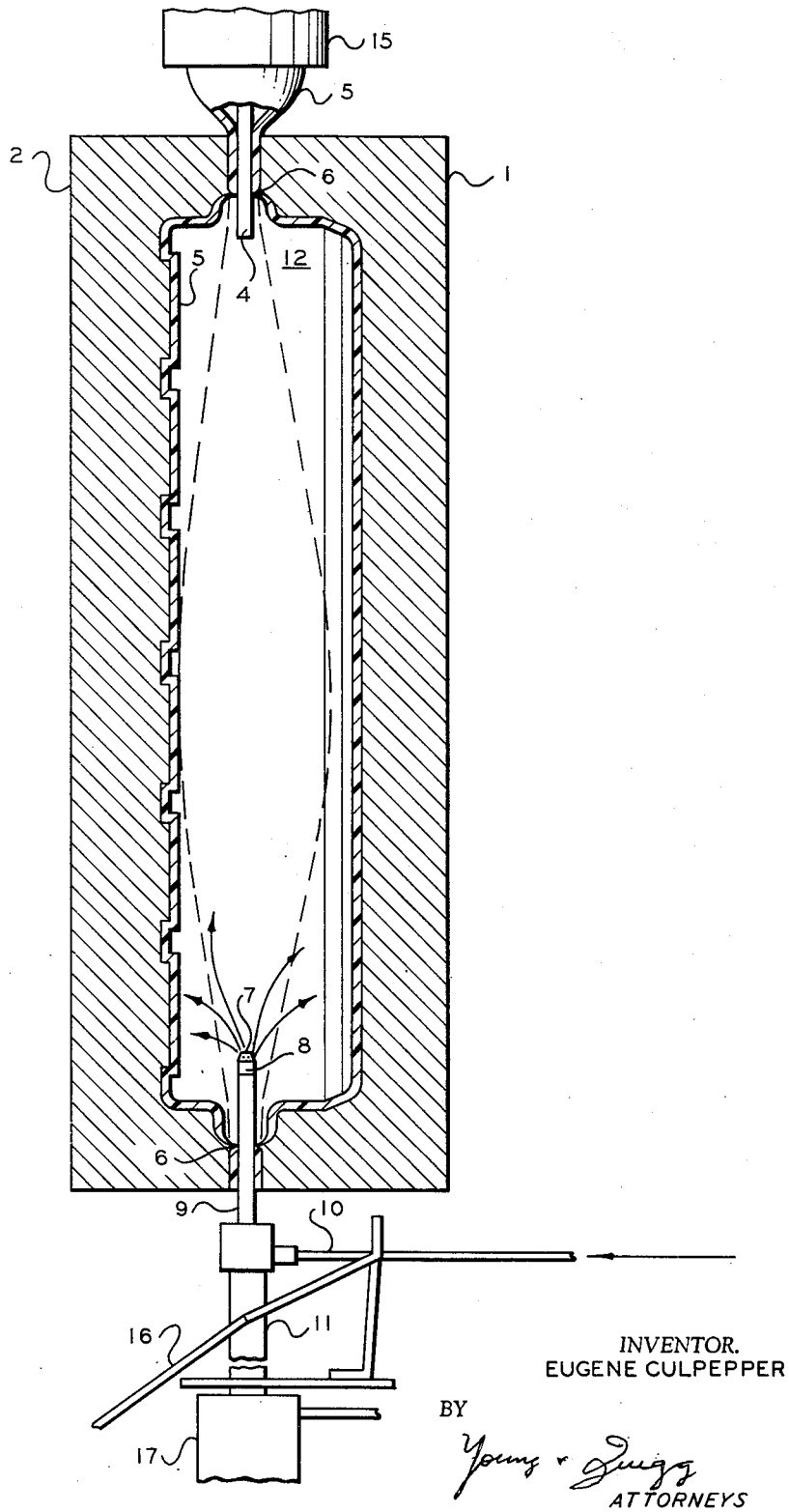

3,505,442
METHOD FOR COOLING BLOW MOLDED ARTICLES

Eugene Culpepper, Newman, Ga., assignor to Phillips Petroleum Company, a corporation of Delaware
Filed Aug. 22, 1967, Ser. No. 662,486
Int. Cl. B29c *17/07, 7/00;* B29d *23/03*
U.S. Cl. 264—89          5 Claims

ABSTRACT OF THE DISCLOSURE

A method is provided for cooling blow molded articles. Articles are blow molded by injecting fluid under pressure into a semi-fluid preform, enclosed within a mold cavity, through a first inlet. The flow of pressurized fluid is discontinued and cooling fluid is injected into the interior of the formed article through a second inlet to cool the article. The first inlet is subsequently vented to the atmosphere to allow for escape of the cooling fluid. A fluid nozzle communicating with the second inlet may be mounted on the lateral extremity of a reciprocally mounted stripper cylinder ram for removing the finished article from the mold.

BACKGROUND

Many articles that can be formed at least in part by blow molding are molded in a unitary structure and further modified following the molding operation to provide the finished article with varieties of structural features which cannot be easily obtained by a single molding step. For example, the beverage case disclosed in U.S. Patent 3,151,762 is formed as a unitary structure comprising both top and bottom of the finished article after which these two portions are cut and perforated to provide the desired openings and end grips.

A significant amount of the cycle time involved in molding such articles, particularly larger articles such as the 24-cell beverage case described in the above noted patent, is required to allow sufficient cooling of the formed article so that extraction of the article from the mold will not result in undesirable deformation. I have found that the cycle time involved in such molding operations can be substantially reduced by providing for the introduction of cooling fluid into the interior of a formed article prior to the opening of the mold through a fluid nozzle communicating with the interior of the formed article through a second opening in the mold other than the opening through which pressurized fluid is introduced to conform the semi-fluid plastic preform to the interior configuration of the mold cavity.

It is, therefore, one object of this invention to provide improved method for forming plastic articles. It is another object of this invention to provide improved method for cooling blow molded articles within the mold. It is yet another object of this invention to provide an improved method for removing molded objects from mold cavities.

SUMMARY

In accordance with the presently preferred embodiment, the cooling fluid nozzle is mounted on the lateral extremity of a stripper cylinder ram reciprocally mounted in alignment with respect to the passage between the several parts of the mold when it is opened. As a result of this configuration, the side wall of the formed plastic article is more thoroughly cooled in the vicinity of contact with the lateral extremity in the stripper cylinder ram on removal of the article from the mold. In addition, the cooling fluid injection nozzle and stripper cylinder ram are cooled by the flow of cooling fluid therethrough with the result that the temperature at the point of contact between the stripper cylinder and the side wall of the finished article is much lower than could otherwise be achieved in the same period of time.

DESCRIPTION OF PREFERRED EMBODIMENTS

The concept of this invention can be better understood by reference to the drawing which is intended to be only a schematic illustration of one embodiment of this concept.

Referring now to the drawing, a semi-fluid parison of plastic material 5 is extruded downwardly from die head 15 having a first pressurized fluid inlet 4 and over stripper ram extension 9 after which mold halves 1 and 2 are closed about the parison 5 as illustrated to seal the mold cavity 12 along the parting line and around pressurized fluid inlet 4 and stripper ram extension 9. Cutting elements 6 provide a thin area for easy removal of flash material. Pressurized fluid such as, for example, air, methane, nitrogen, etc., is introduced to the interior of the semi-fluid parison by way of pressurized fluid inlet 4 under a pressure sufficient to expand parison 5 so that it conforms to the inner wall of the mold cavity 12.

Injection of pressurized fluid through conduit 4 is then discontinued at which time a cooling fluid such as cold air or carbon dioxide, preferably at a temperature within the range of from about $-25°$ to about $15°$ F., is introduced into the interior of the formed article through conduit 10 and nozzle 8 mounted on stripper ram extension 9 and stripper cylinder ram 11 which is in the extended position. Obviously, many different nozzle configurations can be employed. However, I have found that more satisfactory distribution of cooling fluid and therefore more rapid cooling of the formed article is achieved by providing nozzle 8 with plurality of jet orifices 7 oriented at an angle to the longitudinal axis of nozzle 8 whereby the cooling fluid is distributed in a swirling pattern throughout the interior of the mold cavity. In the presently preferred embodiment at least some of these orifices are oriented so as to direct at least a portion of the cooling fluid toward the article side wall adjacent the second inlet whereby that portion of the side wall is rapidly cooled to increase its structural stability and resistance to deformation when the article is removed.

Near the end of the cooling cycle, conduit 4 is disconnected from the source of compressed fluid and is preferably vented to atmosphere to allow the escape of cooling fluid entering the mold cavity by way of nozzle 8. After the completion of the cooling cycle, the duration of which can vary considerably, depending upon the size of the molded article and the finished side wall thickness, the mold parts 1 and 2 are separated to allow removal of the finished cooled article.

It is often the case in such molding operations that some part of the molten article will adhere to at least one surface of the mold cavity and that some means are required to disengage the article from the open mold. In the presently preferred embodiment of this invention, this function is accomplished by stripper cylinder ram 11 which is reciprocally mounted along the longitudinal axis of stripper ram extension 9. When the mold is opened, stripper cylinder ram 11 and extension 9 are retracted by stripper cylinder 17 into the opening in stripper plate 16 to disengage the finished article from the mold and nozzle housing 9.

I have found that the method and apparatus herein described is effective in accomplishing a reduction in cycle time by as much as 15 percent as compared to the conventional method of introducing carbon dioxide through the same inlet through which pressurized fluid is introduced to expand the preform. This improved result derives at least in part from the greatly improved fluid distribution above described. In particular, the introduction of cooling fluid through a nozzle mounted on the stripper cylinder ram facilitates the rapid cooling of the article side wall, especially in the vicinity of the nozzle and nozzle housing. At the same time, all parts of the nozzle, housing, and the stripper cylinder ram are cooled by the passage of cooling fluid therethrough. As a result of these effects, the side wall of the finished article in the area contacted by the stripper cylinder ram is cooled much more thoroughly in a much shorter time than would otherwise be possible and is, therefore, much less susceptible to deformation on removal from the mold.

Obviously, many variations of the embodiments of this invention can be undertaken without departing from the scope of the inventive concept. For example, any form of plastic-like material such as thermoplastics, e.g., polypropylene, polyacrylates, etc., elastomers such as natural and synthetic rubbers, etc., can be blow molded by this procedure. In addition, the preform can be any one of several varieties known in the art. For example, the preform may be a parison which is extruded downwardly over the pressurized fluid inlet and cooling fluid nozzle as described or it may be a preformed parison inserted over these two elements and heated either outside the mold or in situ. In addition, the preform may comprise a single doubled sheet or two separate sheets of plastic-like material which is sealed to form a closed preform on closing the mold parts.

I claim:

1. A method of blow molding a heated moldable hollow preform enclosed within a mold cavity, the interior of which is in open communication with a first inlet for introducing pressurized fluid and exiting of cooling fluid, and a second inlet for introducing cooling fluid into said preform, which comprises passing pressurized fluid into the interior of said preform through said first inlet at a first end of the preform to comform the preform to the interior configuration of said mold and form a molded article, discontinuing the flow of pressurized fluid into the interior of said molded article, passing a cooling fluid into the interior of the thus formed still hot molded article through said second inlet at an end opposite from said first end to cool said article while still confined in said mold, and disconnecting said first inlet from the pressurized fluid and venting said first inlet to the atmosphere so as to allow for escape of the cooling fluid therethrough.

2. The method of claim 1 wherein said cooling fluid is distributed within said preform in a swirling pattern throughout the interior of the mold cavity so as to direct at least a portion of the cooling fluid toward the molded article sidewall adjacent said second inlet whereby that portion of the sidewall is rapidly cooled to increase its structural stability and resistance to deformation when the article is removed.

3. A method of claim 1 wherein said preform is a parison of semi-fluid plastic and the flow of cooling fluid into the interior of the molded article is discontinued and then the molded article is removed from the mold.

4. The method of claim 1 wherein said preform is formed between two halves of said mold cavity from opposing plastic laminae.

5. The method of claim 1 wherein the flow of cooling fluid is discontinued and said mold is at least partially opened after said article is cooled and a stripper cylinder ram is retracted through a stripper plate disengaging said article from the mold and said stripper ram.

References Cited

UNITED STATES PATENTS

| 2,918,698 | 12/1959 | Hagen et al. | 264—98 |
| 3,065,501 | 11/1962 | Gasmire | 264—98 X |
| 3,127,458 | 3/1964 | Scott et al. | 264—98 |
| 3,233,416 | 2/1966 | Rainwater et al. | 264—98 X |

FOREIGN PATENTS

| 866,378 | 4/1961 | Great Britain. |

ROBERT F. WHITE, Primary Examiner

J. H. SILBAUGH, Assistant Examiner

U.S. Cl. X.R.

18—5, 19; 264—334